United States Patent
Adsumilli et al.

(10) Patent No.: US 10,003,768 B2
(45) Date of Patent: Jun. 19, 2018

(54) APPARATUS AND METHODS FOR FRAME INTERPOLATION BASED ON SPATIAL CONSIDERATIONS

(71) Applicant: GoPro, Inc., Carlsbad, CA (US)

(72) Inventors: Balineedu Chowdary Adsumilli, San Francisco, CA (US); Ryan Lustig, Encinitas, CA (US)

(73) Assignee: GOPRO, INC., San Mateo, CA (US)

( * ) Notice: Subject to any disclaimer, the term of this patent is extended or adjusted under 35 U.S.C. 154(b) by 0 days. days.

(21) Appl. No.: 15/278,976

(22) Filed: Sep. 28, 2016

(65) Prior Publication Data

US 2018/0091768 A1   Mar. 29, 2018

(51) Int. Cl.
    *H04N 7/01* (2006.01)
(52) U.S. Cl.
    CPC ........... *H04N 7/0137* (2013.01); *H04N 7/014* (2013.01); *H04N 7/0127* (2013.01)
(58) Field of Classification Search
    CPC ..... H04N 7/0137; H04N 7/0127; H04N 7/014
    See application file for complete search history.

(56) References Cited

U.S. PATENT DOCUMENTS

| | | |
|---|---|---|
| 4,179,704 A | 12/1979 | Kaiser et al. |
| 6,504,569 B1 | 1/2003 | Jasinschi et al. |
| 6,611,607 B1 | 8/2003 | Davis et al. |
| 6,728,317 B1 | 4/2004 | Demos |
| 6,996,244 B1 | 2/2006 | Slaney et al. |
| 7,750,904 B2 | 7/2010 | Jojic et al. |
| 8,290,253 B1 | 10/2012 | Wang et al. |
| 8,606,073 B2 | 12/2013 | Woodman |
| 9,171,577 B1 | 10/2015 | Newman et al. |
| 9,396,588 B1 | 7/2016 | Li |
| 9,547,908 B1 | 1/2017 | Kim et al. |
| 9,575,803 B2 | 2/2017 | Chauvet et al. |
| 9,681,111 B1 | 6/2017 | Newman |

(Continued)

OTHER PUBLICATIONS

Adsumilli C., "A dissertation submitted in partial satisfaction of the requirements for the degree of Doctor of Philosophy in Electrical and Computer Engineering", Sep. 2005, 193 paqes.

(Continued)

*Primary Examiner* — Michael Teitelbaum
(74) *Attorney, Agent, or Firm* — Gazdzinski & Associates, PC

(57) ABSTRACT

Apparatus and methods for the generation of interpolated frames of video data. In one embodiment, a computerized apparatus is disclosed that includes a video data interface configured to receive frames of video data; a processing apparatus in data communication with the video data interface; and a storage apparatus in data communication with the processing apparatus. The computerized apparatus is further configured to: receive frames of captured video data; retrieve capture parameters associated with the frames of captured video data; generate optical flow parameters from the frames of captured video data; ascribe differing weights based on the capture parameters and/or the optical flow parameters; generate frames of interpolated video data for the frames of captured video data based at least in part on the ascribed weights; and compile a resultant video stream using the frames of interpolated video data and the frames of captured video data.

20 Claims, 6 Drawing Sheets

(56) References Cited

U.S. PATENT DOCUMENTS

| | | |
|---|---|---|
| 2003/0007567 A1 | 1/2003 | Newman et al. |
| 2003/0147547 A1 | 8/2003 | Lin et al. |
| 2004/0017504 A1 | 1/2004 | Prandoni et al. |
| 2004/0034781 A1 | 2/2004 | Natarajan |
| 2004/0131229 A1 | 7/2004 | Acharya et al. |
| 2005/0117805 A1 | 6/2005 | Poutet et al. |
| 2006/0071825 A1 | 4/2006 | Demos |
| 2006/0251289 A1 | 11/2006 | Williams et al. |
| 2007/0110298 A1 | 5/2007 | Graepel et al. |
| 2008/0170626 A1 | 7/2008 | Sung et al. |
| 2008/0180439 A1 | 7/2008 | Adabala et al. |
| 2008/0270569 A1 | 10/2008 | McBride et al. |
| 2008/0276089 A1 | 11/2008 | Tian |
| 2009/0132371 A1 | 5/2009 | Strietzel et al. |
| 2009/0153730 A1 | 6/2009 | Knee et al. |
| 2009/0324191 A1 | 12/2009 | Reusens et al. |
| 2010/0156955 A1* | 6/2010 | Kimura ............... G09G 3/3426 345/690 |
| 2010/0177977 A1 | 7/2010 | Seshadri et al. |
| 2010/0266157 A1 | 10/2010 | Shin et al. |
| 2011/0286625 A1 | 11/2011 | Petrovic et al. |
| 2012/0002112 A1 | 1/2012 | Huang et al. |
| 2012/0063670 A1 | 3/2012 | Woo |
| 2012/0170805 A1 | 7/2012 | Brown et al. |
| 2012/0281871 A1 | 11/2012 | Reed et al. |
| 2013/0010067 A1* | 1/2013 | Veeraraghavan ...... G01B 11/22 348/46 |
| 2013/0314442 A1 | 11/2013 | Langlotz et al. |
| 2014/0022394 A1 | 1/2014 | Bae et al. |
| 2014/0050454 A1 | 2/2014 | Slotte |
| 2014/0063061 A1 | 3/2014 | Reitan |
| 2014/0267801 A1 | 9/2014 | Grundmann et al. |
| 2015/0371447 A1 | 12/2015 | Yasutake |
| 2016/0057363 A1 | 2/2016 | Posa |
| 2016/0080830 A1 | 3/2016 | Kim et al. |
| 2016/0125633 A1 | 5/2016 | Windmark et al. |
| 2016/0205341 A1 | 7/2016 | Hollander et al. |
| 2016/0239340 A1 | 8/2016 | Chauvet et al. |
| 2016/0274338 A1 | 9/2016 | Davies et al. |
| 2016/0358628 A1 | 12/2016 | Liu et al. |
| 2016/0366396 A1 | 12/2016 | Kim et al. |

OTHER PUBLICATIONS

Adsumilli C. et al., "A Dynamically Adaptive Constrained Unequal Error Protection Scheme for Video Transmission over Wireless Channels", Proceedings IEEE International Workshop on Multimedia Signal Processing, 2002, pp. 41-44, Virgin Islands, USA.

Adsumilli C. et al., "A Hybrid Constrained Unequal Error Protection and Data Hiding Scheme for Packet Video Transmission", Proceedings IEEE International Conference on Acoustics, Speech, and Signal Processing (ICASSP), Apr. 2003, pp. V680-V683, Hong Kong.

Adsumilli C. et al., A Noise Based Quantization Model for Restoring Block Transform Compressed Images:, Proceedings of the IAST£0 International Conference Signal and Image Processing, Aug. 13-16, 2001, pp. 354-359, Honolulu, Hawaii, USA.

Adsumilli C. et al., "A Robust Error Concealment Technique Using Data Hiding for Image and Video Transmission Over Lossy Channels", IEEE Transactions on Circuits and Systems for Video Technology, Nov. 2005, pp. 1394-1406, vol. 15(11 ).

Adsumilli C. et al., "Adapive Wireless Video Communications: Challenges and Approaches", Proceedings of International Workshop on Packet Video, Apr. 2002, pp. 1-11, Pittsburgh, Pennsylvania, USA.

Adsumilli C. et al., "Detector Performance Analysis of Watermark-Based Error Concealment in Image Communications", Proceedings IEEE International Conference on Image Processing, 2005, pp. 916-919, vol. 3.

Adsumilli C. et al., "Error Concealment in Video Communications by Informed Watermarking", PSIVT, 2006, pp. 1094-1102.

Adsumilli C. et al., "Error Concealment in Video Communications Using DPCM Bit Stream Embedding", Proceedings IEEE International Conference on Acoustics, Speech and Signal Processing (ICASSP), Apr. 2005, pp. 11-169-11-172, Philadelphia, USA.

Baker, et al., "A Database and Evaluation Methodology for Optical Flow" International Journal of Computer Vision 92.1 (2011): 1-31.

Boucherkha, S., et al., "A Lossless Watermarking Based Authentication System for Medical Images", Would Academy of Science, Engineering and Technology, International Journal of Medical, Health, Biomedical, Bioengineering and Pharmaceutical Engineering, 2007, vol. 1, No. 1, pp. 20-23.

Brox, et al., "High Accuracy Optical Flow Estimation Based on a Theory for Warping", European Conference on Computer Vision, Springer-Verlag Berlin Heidelberg, 2004.

Carli M. et al., "Video Watermarking in 30 OCT Domain", Proceedings of International Workshop on Spectral Methods and Multirate Signal Processing, Jun. 2005, pp. 141-144, Riga, Lavia, (Invited Paper).

Cavallaro, et al., "Object-based video: extraction tools, evaluation metrics and applications", Visual Communications and Image Processing; Jul. 8, 2003-Jul. 11, 2003, Lugano Switzerland, XP030080620.

Davis, et al., "The Visual Microphone: Passive Recovery of Sound from Video" (2014).

Didyk, et al., "Joint View Expansion and Filtering for Automultiscopic 3D Displays", ACM Transactions on Graphics (TOG) 32.6 (2013): 221.

Freeman, et al., "Shape-Time Photography" IEEE Computer Society Conference on Computer Vision and Pattern Recognition, vol. 2. IEEE, 2003.

Fridrich, J., et al., "Lossless Data Embedding—New Paradigm in Digital Watermarking", EURASIP Journal on Applied Signal Processing, Oct. 29, 2001, pp. 185-196.

Haouzia et al., "Methods for Image Authentication: A Survey," Multimedia Tools Appl, 2008, 46 pages.

Huang, et al., "Maximum a Posteriori Probability Estimation for Online Surveillance Video Synopsis", IEEE Transactions on Circuits and Systems for Video Technology, IEEE Service Center, Piscataway, NJ, US, vol. 24, No. 8, Aug. 1, 2014 (Aug. 1, 2014), pp. 1417-1429.

Kaur, M., et al., "A Review on Digital Watermarkign Using LSB", International Journal of Advanced Research in Computer Science and Software Engineering, Nov. 2005, vol. 5, Issue 11, pp. 1210-1214.

Schnyder, et al., "Depth image based compositing for stereo 3D", 3DTV-Conference: The True Vision—Capture, Transm1ss10n and Display of 3D Video (3DTV-CON), 2012, IEEE, Oct. 15, 2012, pp. 1-4.

Schnyder L., et al., "2D to 3D Conversion of Sports Content using Panoramas," Image Processing (ICIP), 2011, IEEE, pp. 1961-1964.

Schwartz, E., et al., "Implementation of Compression with Reversible Embedded Wavelets," In Proc. SPIE, 1995, 12 pages.

Shannon, "A Mathematical Theory of Communication", Bell Syst. Tech. J., 27:379-423, 623-656, 1948.

Szeliski, et al., "Fast Poisson blending using Multi-Splines." Computational Photography (ICCP), 2011 IEEE International Conference.

Tonci F. et al., "Buffer Constraints for Rate-Distortion Optimization in Mobile Video Communications", Proceedings of International Symph on Signals, Circuits and Systems, Jul. 2005, pp. 71-74, Lasi, Romania (Invited Paper).

Vass, J., et al., "Efficient Three-Dimensional Wavelet Codecs for Networked Video Communication," in Proceedings of IEEE International Conference on Image Processing, Kobe, Japan, Oct. 1999, pp. 565-569.

Wadhwa, et al., "Phase-Based Video Motion Processing", ACM Transactions on Graphics (TOG) 32.4 (2013): 80.

Weinzaepfel, et al., "Deepflow: Large displacement optical flow with deep matching", Proceedings of the IEEE International Conference on Computer Vision, 2013.

Achanta R., et al., "Slic Superpixels Compared to State-of-The-Art Superpixel Methods," IEEE Transactions on Pattern Analysis and Machine Intelligence, 2012, vol. 34 (11), pp. 2274-2282.

(56) References Cited

OTHER PUBLICATIONS

Allène C., et al., "Seamless Image-based Texture Atlases Using Multi-band Blending," Pattern Recognition, 2008. ICPR 2008. 19th International Conference on, 2008.
Badrinarayanan V., et al., "Segnet: a Deep Convolutional Encoder-Decoder Architecture for Image Segmentation," arXiv preprint arXiv:1511.00561, 2015.
Barghout L. and Sheynin J., "Real-world scene perception and perceptual organization: Lessons from Computer Vision". Journal of Vision, 2013, vol. 13 (9).
Barghout L., "Visual Taxometric approach Image Segmentation using Fuzzy-Spatial Taxon Cut Yields Contextually Relevant Regions," Communications in Computer and Information Science (CCIS), Springer-Verlag, 2014, pp. 163-173.
Bay H., et al., "Surf: Speeded up Robust Features," European Conference on Computer Vision, Springer Berlin Heidelberg, 2006, pp. 404-417.
Beier et al., "Feature-Based Image Metamorphosis," in Computer Graphics Journal, Jul. 1992, vol. 26 (2), pp. 35-42.
Brainard R.C., et al., "Low-Resolution TV: Subjective Effects of Frame Repetition and Picture Replenishment," Bell Labs Technical Journal, Jan. 1967, vol. 46 (1), pp. 261-271.
Burt et al., "A Multiresolution Spline with Application to Image Mosaics," in ACM Transactions on Graphics (TOG), 1983, vol. 2, No. 4, pp. 217-236.
Chan T.F. and Vese LA., "Active contours without edges". IEEE Transactions on Image Processing, 2001, 10 (2), pp. 266-277 (hereinafter "Chan").
Chang H., et al., "Super-resolution Through Neighbor Embedding," Computer Vision and Pattern Recognition, 2004. CVPR 2004. Proceedings of the 2004 IEEE Computer Society Conference on, vol. 1, 2004.
Elen R., "Whatever happened to Ambisonics" AudioMedia Magazine, Nov. 1991.
Gracias N., et al., "Fast Image Blending Using Watersheds and Graph Cuts," Image and Vision Computing, 2009, vol. 27 (5), pp. 597-607.
Herbst E., et al., "Occlusion Reasoning for Temporal Interpolation Using Optical Flow," Department of Computer Science and Engineering, University of Washington, Tech. Rep. UW-CSE-09-08-01, 2009.
http://www.ambisonic.net/.
http://www.webmproject.org/vp9.
In Computer vision, The proceedings of the seventh IEEE international conference on, 1999, vol. 2, pp. 1150-1157.
Information technology—Coding of audio-visual objects—Part 10: Advanced Video Coding ; ITU-T H.264 ; ISO/IEC 14496-10:2012.
ITU-T Study Group 16—Video Coding Experts Group (VCEG) ; ITU-T H.265, and/or ISO/IEC 23008-2:2015.
Jakubowski M., et al., "Block-based motion estimation algorithms—a survey," Opto-Electronics Review 21, No. 1 (2013), pp. 86-102.
Kendall A., et al., "Bayesian Segnet: Model Uncertainty in Deep Convolutional Encoder-Decoder Architectures for Scene Understanding," arXiv preprint arXiv:1511.02680, 2015.
Mitzel D., et al., "Video Super Resolution Using Duality Based TV-l 1 Optical Flow," Joint Pattern Recognition Symposium, 2009, pp. 432-441.
Pérez et al., "Poisson Image Editing," in ACM Transactions on Graphics (TOG), 2003, vol. 22, No. 3, pp. 313-318.
Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.
SMPTE 2073 family of encoding standards (also known as VC-5); these include without limitation: SMPTE ST 2073-1, SMPTE ST 2073-3, SMPTE ST 2073-4.
Suzuki et al., "Inter Frame Coding with Template Matching Averaging," in IEEE International Conference on Image Processing Proceedings (2007), vol. (III), pp. 409-412.
Szeliski R., "Computer vision: algorithms and applications," Springer Science & Business Media, 2010.
Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.
Xiao J., and Quan L., "Multiple View Semantic Segmentation for Street View Images," 2009 IEEE 12th International Conference on Computer Vision, 2009, pp. 686-693.
Xiong Y., et al., "Gradient Domain Image Blending and Implementation on Mobile Devices," International Conference on Mobile Computing, Applications, and Services, Springer Berlin Heidelberg, 2009, pp. 293-306.
Zhai et al., "A Low Complexity Motion Compensated Frame Interpolation Method," in IEEE International Symposium on Circuits and Systems (2005), pp. 4927-4930.
Zhang., "A Flexible New Technique for Camera Calibration" IEEE Transactions, dated Nov. 2000, vol. 22, No. 11, pp. 1330-1334.

\* cited by examiner

US 10,003,768 B2

APPARATUS AND METHODS FOR FRAME INTERPOLATION BASED ON SPATIAL CONSIDERATIONS

RELATED APPLICATIONS

This application is related to co-owned and co-pending U.S. patent application Ser. No. 15/251,980 filed Aug. 30, 2016 and entitled "Apparatus and Methods for Frame Interpolation"; co-owned and co-pending U.S. patent application Ser. No. 15/251,896 filed Aug. 30, 2016 and entitled "Apparatus and Methods for Video Image Post-Processing for Correcting Artifacts"; and co-owned and co-pending U.S. patent application Ser. No. 15/270,971 filed Sep. 20, 2016 and entitled "Apparatus and Methods for Video Image Post-Processing for Segmentation-Based Interpolation", each of the foregoing incorporated herein by reference in their entireties.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to processing of image and/or video content, and more particularly in one exemplary aspect to interpolating frames of video.

Description of Related Art

Video content may include a bitstream characterized by a number of frames that are played back at a specified frame rate. In some video applications, it may be desirable to add frames to video content. Video frames may be added to, for example, convert video content from one frame rate to another. For instance, video may be streamed over the Internet at a low frame rate, and then converted to a higher frame rate during decoding by a video player for presentation to a viewer. As another example, video content may be converted between cinematic, PAL, NTSC, HDTV, and slow motion frame rates during encoding. Video frames may also be added to improve visual quality of the video content, or even supplement missing or corrupted data or to compensate for certain types of artifacts.

Frame interpolation techniques may be used to generate new frames from original frames of the video content. Frame interpolation involves creating a new frame from two (three, four, five, or more) discrete frames of video; for example, as between Frame t and Frame t+1 (t and t+1 indicating two discrete points of time in this example). Any number of new frames (e.g., 1 to 1000 frames) may be generated between the two or more discrete frames as shown in FIG. 1. In general, a new frame is created at Frame t+α, where α is between 0 and 1. Typically, Frame t+α is created based solely on pixel information from Frame t and Frame t+1 (see FIG. 1). Conventional techniques of frame interpolation include frame or field repetition, temporal filtering or blending, and motion estimation and compensation.

One heretofore largely overlooked aspect of image processing has been the relationship of spatial considerations to frame interpolation. As a brief aside, pictures (still images) and video (moving images) were historically captured with single image capture devices that represented images and/or video from a single vantage point with as little distortion as possible. Within this environment, displays also assumed minimal distortion throughout the image space. Consequently, frame interpolation processes were designed to interpolate frames uniformly without regard to spatial considerations. More directly, frame interpolation solutions generate video (or image) frames using interpolation techniques that do not vary over the image space.

However, with the advent of more sophisticated image processing software and changes in image capture techniques and customer tastes, "non-uniform image capture" (e.g., binocular, spherical and/or panoramic image content) has steadily increased in adoption and usage. Unfortunately, non-uniform image capture does not fit the traditional frame interpolation paradigm (e.g., single vantage point, minimal distortion), and thus existing interpolation schemes are poorly suited for rendering such content. For example, an interpolated frame may perform a straightforward averaging of the value of pixels from different frames, resulting in artifacts that appear transparent or objects that appear in multiple locations in the resulting video. Moreover, rendering software may experience higher processing burden when attempting to correct for such undesirable artifacts in post-processing and/or editing.

To these ends, improved solutions are needed for frame interpolation that appropriately accounts for non-uniform elements or characteristics of the content. Such elements or characteristics may be used by the frame interpolation computer programs (e.g., software) to improve the accuracy of video reproduction, as well as reduce processing burden, memory consumption and/or other processing resources.

SUMMARY

The present disclosure satisfies the foregoing needs by providing, inter alia, methods and apparatus for interpolating frames of non-uniform content.

In a first aspect of the present disclosure, an apparatus configured to generate interpolated frames of video data is disclosed. In one embodiment, the apparatus includes a computerized apparatus configured to generate interpolated frames of video data. The apparatus includes a video data interface configured to receive frames of video data; a processing apparatus in data communication with the video data interface; and a storage apparatus in data communication with the processing apparatus, the storage apparatus having a non-transitory computer readable medium comprising instructions which are configured to, when executed by the processing apparatus, cause the computerized apparatus to: receive frames of captured video data; retrieve capture parameters associated with the frames of captured video data; generate optical flow parameters from the frames of captured video data; for each frame of the frames of captured video data, ascribe differing weights based on the capture parameters and/or the optical flow parameters; generate frame(s) of interpolated video data for the frames of captured video data based at least in part on the ascribed differing weights; and compile a resultant video stream using the frame(s) of interpolated video data and the frames of captured video data.

In a second aspect of the present disclosure, a method of generating interpolated frames of video data is disclosed. In one embodiment, the method includes causing a receipt of two or more source images; causing the addition of a plurality of weights for various spatial portions for each of the received two or more source images in order to generate two or more spatially weighted images; causing the generation of an interpolated image from the two or more spatially weighted images; and causing the assembly of a resultant image stream using the interpolated image and the two or more source images.

In another aspect of the present disclosure, a video processing system is disclosed. In one embodiment, the video processing system includes logic configured to: receive two or more source images; add a plurality of weights for various spatial portions of each of the received two or more source images in order to generate two or more spatially weighted images; generate an interpolated image from the two or more spatially weighted images; and assemble a resultant image stream via use of the interpolated image and the two or more source images.

In still a further aspect of the present disclosure, a computer readable storage medium is disclosed. In one embodiment, the computer readable storage medium includes executable instructions that are configured to, when executed, receive frames of captured video data; retrieve capture parameters associated with the frames of captured video data; generate optical flow parameters from the frames of captured video data; for each frame of the frames of captured video data, ascribe differing weights based on the capture parameters and/or the optical flow parameters; generate frame(s) of interpolated video data for the frames of captured video data based at least in part on the ascribed differing weights; and compile a resultant video stream using the frame(s) of interpolated video data and the frames of captured video data.

In another aspect of the disclosure, an integrated circuit (IC) apparatus is disclosed. In one embodiment, the IC is configured to execute instructions configured to implement the aforementioned method for generating interpolated frame(s) of video data.

Other features and advantages of the present disclosure will immediately be recognized by persons of ordinary skill in the art with reference to the attached drawings and detailed description of exemplary embodiments as given below.

Figure 1:
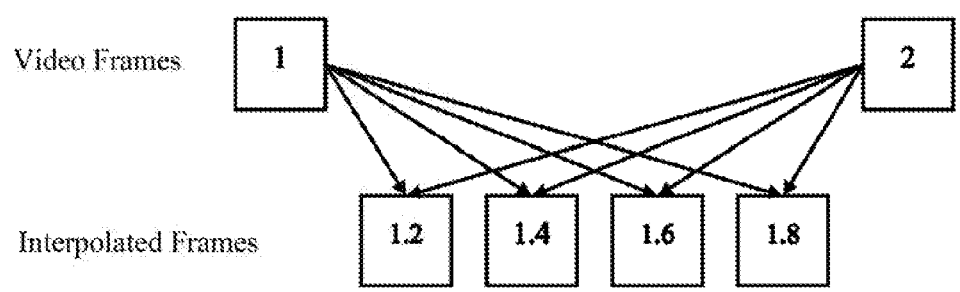
FIG. 1 is a graphical illustration of an approach to generating a plurality of interpolated frames with respect to the source frames.

All Figures disclosed herein are © Copyright 2016 GoPro Inc. All rights reserved.

DETAILED DESCRIPTION

Implementations of the various aspects of the present technology will now be described in detail with reference to the drawings, which are provided as illustrative examples so as to enable those skilled in the art to practice the technology. Notably, the figures and examples below are not meant to limit the scope of the present disclosure to a single implementation or implementations, but other implementations are possible by way of interchange of or combination with some or all of the described or illustrated elements. Wherever convenient, the same reference numbers will be used throughout the drawings to refer to same or like parts.

Overview

Source video content includes a number of source frames or images that are played back at a specified frame rate. In some video applications, it may be desirable to increase the number of frames in video content so as to achieve one or more objectives such as reduced perceivable motion artifact. Frame interpolation is a commonly used technique for inserting additional "filler" frames between source frames, effectively uprating a video stream. Existing frame interpolation solutions treat all video frames uniformly; this may result in e.g., ghostly images, blurry images, choppy images, and/or other undesirable visual artifacts.

Frame interpolation is made up of two parts, optical flow (motion of pixels) and pixel interpolation. The interpolation phase uses the optical flow information to determine the location and color of pixels in the interpolated image. However, optical flow information does not take into account the lens distortion of the image capture device, nor the movement of the objects in the frame. For example, a camera with a wide-angle field of view (FOV) may have severe lens distortion; thus, objects moving in front of the camera may appear to move on curved (or other non-linear) paths. Objects in the center move slower, while objects further from the center move faster. Frame interpolation that treats these distortions uniformly between two frames without accounting for the lens distortion leads to the aforementioned degraded image quality in terms of blurry, non-smooth, non-sharp edges as well as distorted or warped objects.

In one salient aspect, the present disclosure provides improved apparatus and methods for generating interpolated frames while considering the various factors affecting the quality of pixels from the source frames. More generally, the "quality" (and corresponding weight) of a pixel indicates that the pixel should be given more deference (relative to other pixels which may have conflicting information) when interpolating frames from multiple source frames. As described in greater detail herein, exemplary embodiments of the present disclosure weight the pixel information associated with portions of the spatial image differently due to the capture device's perspective, optical flow/scene motion, encoding quality, and physical attributes.

Existing Interpolation Techniques—

As a brief aside, frame interpolation is performed on frames of data which have been previously encoded from e.g., raw video data. Presently available standard video compression codecs, encode visual content into "hard" decision values (i.e., the pixel values are selected from a fixed set of possible values) that do not convey underlying pixel quality. Common examples of such codec technologies include e.g., H.264 (described in ITU-T H.264 (January 2012) and/or ISO/IEC 14496-10:2012, Information technology—Coding of audio-visual objects—Part 10: Advanced Video Coding, each of the foregoing incorporated herein by reference in its entirety), High Efficiency Video Coding (HEVC) also known as H.265 (described in e.g., ITU-T Study Group 16—Video Coding Experts Group (VCEG)—ITU-T H.265, and/or ISO/IEC JTC 1/SC 29/WG 11 Motion Picture Experts Group (MPEG)—the HEVC standard ISO/IEC 23008-2:2015, each of the foregoing incorporated herein by reference in its entirety), and/or the VP9 video codec (described at e.g., http://www.webmproject.org/vp9).

During frame interpolation, the pixel values from two or more frames are used as discrete points over a range, and intermediary points may be estimated within the range based on an assumption of continuity (e.g., straight line approximations, or other curve-fitting schemes). There are a multitude of existing techniques for frame interpolation. Different techniques have varying computational complexity and accuracy; for example, common interpolation schemes may include (but are not limited to): (i) frame repetition, (ii) frame averaging, (iii) motion compensated frame interpolation (including, e.g., block-based motion estimation and pixel-wise motion estimation), and (iv) motion blending (including, e.g., Barycentric interpolation, radial basis, K-nearest neighbors, and inverse blending).

As used herein, "frame repetition" refers generally to interpolating frames by simply repeating frames, such as is described generally within "*Low-Resolution TV: Subjective Effects of Frame Repetition and Picture Replenishment*," to R. C. Brainard et al., *Bell Labs Technical Journal*, Vol 46, (1), January 1967, incorporated herein by reference in its entirety.

As used herein, "frame averaging" refers generally to interpolating frames based on averaging pixel values between frames, such as is described generally within "*Low Complexity Algorithms for Robust Video frame rate up-conversion (FRUC) technique*," to T. Thaipanich et al., *IEEE Transactions on Consumer Electronics*, Vol 55, (1): 220-228, February 2009; "*Inter Frame Coding with Template Matching Averaging*," to Suzuki et al., in *IEEE International Conference on Image Processing Proceedings* (2007), Vol (III): 409-412; and "*Feature-Based Image Metamorphosis*," to Beier et al., in *Computer Graphics Journal*, Vol 26, (2), 35-42, July 1992, each of the foregoing incorporated herein by reference in its entirety.

As used herein, "motion compensated" refers generally to frame interpolation based on motion compensation between frames, such as is described generally within "*Block-based motion estimation algorithms—a survey*," to M. Jakubowski et al., *Opto-Electronics Review* 21, no. 1 (2013): 86-102; "*A Low Complexity Motion Compensated Frame Interpolation Method*," to Zhai et al., in *IEEE International Symposium on Circuits and Systems* (2005), 4927-4930, each of the foregoing incorporated herein by reference in its entirety.

As used herein, "motion blending" refers generally to frame interpolation based on blending motion compensation information between frames, such as is described generally within "*Computer vision: algorithms and applications*," to R. Szeliski, Springer Science & Business Media (2010); "*A Multiresolution Spline with Application to Image Mosaics.*," to Burt et al., in *ACM Transactions on Graphics (TOG)*, vol. 2, no. 4 (1983): 217-236; "*Poisson Image Editing*," to Pérez et al., in *ACM Transactions on Graphics (TOG)*, vol. 22, no. 3, (2003): 313-318, each of the foregoing incorporated herein by reference in its entirety.

Some deficiencies of existing techniques may result in a uniform treatment of all pixels during the frame interpolation process. In other words, some interpolation schemes treat all "hard" data values the same.

Apparatus—

Various embodiments of the present disclosure quantify a relative pixel quality based on e.g., spatial weighting, lens distortion, optical flow, temporal information, and/or any number of other factors that may bear on the relative quality of pixel information. More directly, weighing pixel information to appropriately reflect differences in the underlying quality of visual content may provide more accurate source information for frame interpolation. The described embodiments may use the weighted source information to e.g., improve interpolated frame quality, reduce processing and memory burden, and/or reduce power consumption and processing time.

Consider a so-called "fisheye" lens capture device which produces a visually distorted panoramic or hemispherical image. Instead of traditional straight lines of perspective (rectilinear images), a fisheye lens produces a characteristic convex, non-rectilinear appearance. More directly, the center of the fisheye image experiences the least distortion, whereas the edges of the fisheye image experience large distortive effects. When encoded and/or decoded, the edges of the fisheye image are more prone to inaccuracy (due to e.g., rounding errors, blocking errors, and/or other artifacts of digitization) than the center. More generally, certain so-called "spherical" lenses provide a wider field of view (FOV), at the expense of non-rectilinear distortions. One common usage of spherical lenses includes e.g., digital post-processing to render a dynamically adjustable rectilinear view of a smaller portion of the visual content (i.e., allowing a user to "look around" the same source image).

Additionally, an imperfect encoding process may introduce distortion; for example, post-processing pictures often requires significant interpolation and/or extrapolation of "filler" pixel data from the source image data. Consider software that "stitches" together multiple partially overlapping images to achieve panoramic effects and/or other artificially enhanced field of views. Since the source images for the stitched image are taken from slightly different vantage points (i.e., with slight parallax) under slightly different time, angle, and light conditions. The stitching software constructs the panoramic image by interpolating/extrapolating image content from the source images. This may result in certain image artifacts, ghost images, or other undesirable effects.

Yet another source for image distortion is excessive "optical flow" and/or "scene movement" between frames. Encoding codecs use previous and/or subsequent frame information to assist in the encoding/decoding of an image frame. As a brief aside, compression codecs are generally classified as lossy or lossless. Lossy codecs use methods that create inexact approximations of the original visual content, and may discard some data. Lossy codecs are primarily used to reduce data size for storage, handling, and transmitting content. Lossless codecs use methods that create exact replicas of the original visual content; no data is discarded during compression. Lossless codecs generally may not achieve the same degree of compression as lossy codecs. The degree and amount of compression under both lossy and lossless techniques may be based on device considerations such as memory, processing capability, power consumption, throughput/latency (e.g., for streaming applications). Common examples of such codecs include, without limitation, the aforementioned standard video compression codecs, e.g., H.264, H.265, Motion Picture Experts Group (MPEG), and/or VP9 video codec.

For example, if the image has not changed very much between two (2) frames, then an encoder may significantly compress a second frame by only encoding its differences from a first frame. Of course, difference-based compression is less effective where there are large changes between frames (i.e., the increased size of the differentially encoded frame reduce the benefits of difference-based compression). Since most encoding techniques use a lossy encoding technique, excessive optical flow/scene movement will result in sub-par encoding and/or "blocking" artifacts.

In some cases, the encoding scheme formats the visual content to facilitate post-processing functionality (e.g., video editing.) Typically, such encoding reduces the processing burden associated with certain types of post-processing. For example, the so-called "Cineform" compression standard (used by the Assignee hereof), and described in U.S. Pat. No. 9,171,577 entitled "ENCODING AND DECODING SELECTIVELY RETRIEVABLE REPRESENTATIONS OF VIDEO CONTENT", filed on May 23, 2011, incorporated herein by reference in its entirety) is a compressed video data structure that is selectively decodable to a plurality of resolutions including the full resolution of the uncompressed stream. During decoding, efficiency is substantially improved because only the data components necessary to generate a desired resolution are decoded. In variations, both temporal and spatial decoding are utilized to reduce frame rates, and hence, further reduce processor load.

In some implementations, frame interpolation processing may be affected by distortions in the source image that have been introduced during capture and/or encoding. Since frame interpolation attempts to estimate intermediary data points based on the source data points, introducing such errors into the source frames may directly affects the resulting interpolated frame. To these ends, various aspects of the present disclosure spatially weight pixel values during frame interpolation to reflect differences in an underlying quality of visual content. More directly, since different portions of the image have different levels of quality, the frame interpolation process may weigh the source pixel values to appropriately adjust their contribution to the resulting interpolated frame. While the following disclosure is primarily discussed with respect to spatial contexts; artisans of ordinary skill in the related arts will readily appreciate that the principles described herein may be broadly applied to any portion of an image and/or video. For example, certain frames or time slices of a video stream may be associated with temporally weighted parameters. Similarly, metadata portions of visual content may be associated with different degrees of weighted parameters.

To generate new frames of video content based on spatial and/or temporal considerations, each pixel or group of pixels within a frame is ascribed a weight that is based on both optical flow associated with the pixel(s) and/or the distortions attributed to the capture mechanism (e.g., lens, focal distance, lighting, and/or other video capture parameters) and/or other processing (e.g., encoding, stitching, and/or other post-processing activity). During interpolation, the pixel values of two (2) or more frames of video are combined to create an interpolated frame.

Figure 2:
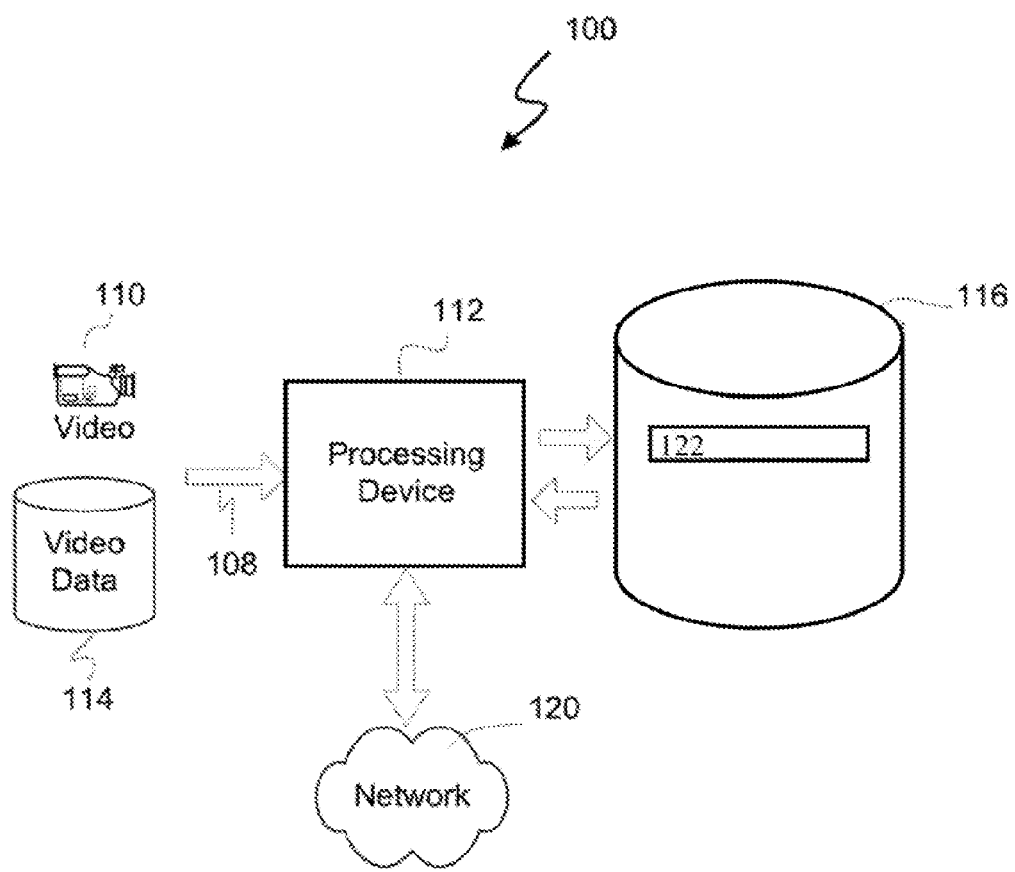
FIG. 2 is a logical block diagram of an exemplary implementation of video data processing system according to the present disclosure.

Referring now to FIG. 2, a block diagram of an exemplary configuration of a video processing system 100 configured to generate interpolated frames from video content. In the embodiment of FIG. 2, a processing unit 112 receives a source video stream 108 (e.g., sequences of frames of digital images and audio). The source video stream may originate from a variety of sources including a video capture device 110 and a data storage unit 114. The source video stream 108 may be conveyed by a variety of bus technologies including USB, DisplayPort, Thunderbolt, or IEEE-1394 compliant cabling, PCI bus, HD/SDI communications link, any 802.11 standard, and other bus technologies. The source video stream 108 may be in a compressed (e.g., MPEG) or uncompressed form. If the source video stream 108 is compressed, it may be decompressed to an uncompressed form. Also shown is a data storage unit 116 configured to store a video stream 122 produced from the source video stream 108 and interpolated frames generated from the source video stream 108. A network 120 (e.g., the Internet) may be used to carry a video stream to remote locations.

Figure 3:
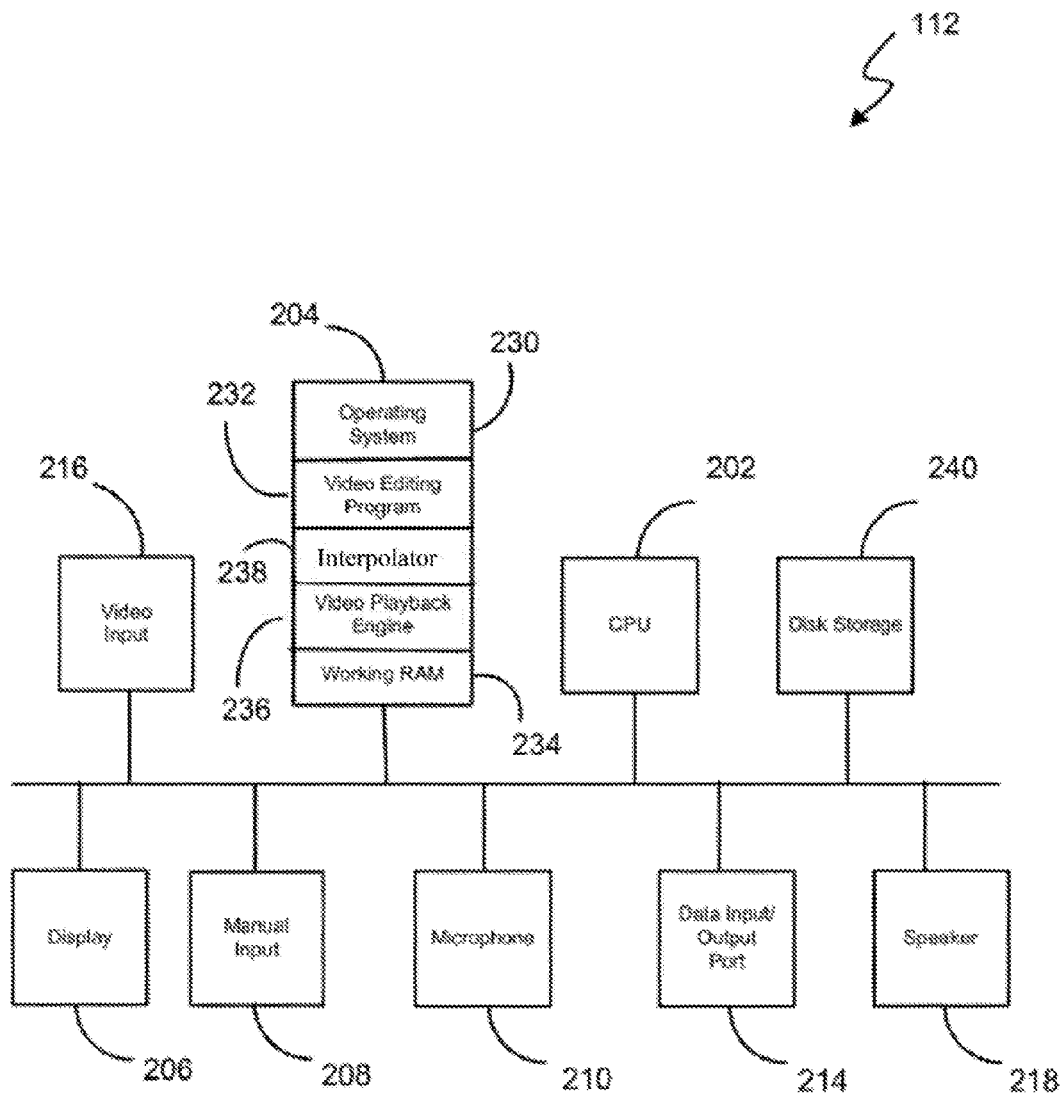
FIG. 3 is a functional block diagram illustrating the principal components of one implementation of the processing unit of the system of FIG. 2.

FIG. 3 is a block diagram illustrating the principal components of the processing unit 112 of FIG. 2 as configured in accordance with an exemplary implementation. In this exemplary implementation, the processing unit 112 includes a computing device (e.g., a standard personal computer) configured to execute instructions stored within a non-transitory computer readable medium for generating interpolated frames of a video stream. Although the processing unit 112 is depicted in a "stand-alone" arrangement in FIG. 2, in some implementations the processing unit 112 may be incorporated into a video recorder or image capturing device or part of a non-computer device such as a media player such as a DVD or other disc player. In other implementations, the processing unit 112 may be incorporated into a smartphone, a tablet computer, a phablet, a smart watch, a portable computer, and/or other device configured to process video content.

As shown in FIG. 3, the processing unit 112 includes a central processing unit (CPU) 202 adapted to execute a multi-tasking operating system 230 stored within system memory 204. The CPU 202 may in one variant be rendered as a system-on-chip (SoC) including, inter alia, any of a variety of microprocessor or micro-controllers known to those skilled in the art, including digital signal processor (DSP), CISC, and/or RISC core functionality, whether within the CPU or as complementary integrated circuits (ICs). The memory 204 may store copies of a video editing program 232 and a video playback engine 236 executed by the CPU 202, and also includes working RAM 234.

It will also be appreciated that the processing unit 112, as well as other components within the host apparatus of FIG. 2, may be configured for varying modes of operation which have, relative to other modes: (i) increased or decreased electrical power consumption; (ii) increased or decreased thermal profiles; and/or (iii) increased or decreased speed or execution performance, or yet other such modes. In one implementation, a higher level logical process (e.g., software or firmware running on the SoC or other part of the apparatus) is used to selectively invoke one or more of such modes based on current or anticipated use of the interpolation sequences described herein; e.g., to determine when added computational capacity is needed—such as when a high frame rate and inter-frame motion are present), and activate such capacity anticipatorily (or conversely), place such capacity to "sleep" when the anticipated demands are low.

It is also contemplated herein that certain parametric values relating to host device and/or SoC operation may be used as inputs in determining appropriate interpolation sequence selection and execution. For example, in one such implementation, approaching or reaching a thermal limit on the SoC (or portions thereof) may be used by supervisory logic (e.g., software or firmware) of the apparatus to invoke a less computationally intensive interpolation sequence (or regime of sequences) until the limit is obeyed. Similarly, a "low" battery condition may invoke a more power-efficient regime of interpolation so as to conserve remaining operational time. Moreover, multiple such considerations may be blended or combined together within the supervisory logic; e.g., where the logic is configured to prioritize certain types of events and/or restrictions (e.g., thermal limits) over other considerations, such as user-perceptible motion artifact or video "choppiness", yet prioritize user experience over say a low battery warning. Myriad other such applications will be recognized by those of ordinary skill given the present disclosure.

In the illustrated configuration the CPU 202 communicates with a plurality of peripheral equipment, including video input 216. Additional peripheral equipment may include a display 206, manual input device 208, microphone 210, and data input/output port 214. Display 206 may be a visual display such as a cathode ray tube (CRT) monitor, a liquid crystal display (LCD) screen, LED/OLED monitor, capacitive or resistive touch-sensitive screen, or other monitors and displays for visually displaying images and text to a user. Manual input device 208 may be a conventional keyboard, keypad, mouse, trackball, or other input device for the manual input of data. Microphone 210 may be any suitable microphone for providing audio signals to CPU 202. In addition, a speaker 218 may be attached for reproducing audio signals from CPU 202. The microphone 210 and speaker 218 may include appropriate digital-to-analog and analog-to-digital conversion circuitry as appropriate.

Data input/output port 214 may be any data port for interfacing with an external accessory using a data protocol such as RS-232, USB, or IEEE-1394, or others named elsewhere herein. Video input 216 may be via a video capture card or may be any interface that receives video input such as via, for example, a media player such as DVD or D-VHS, or a port to receive video/audio information. In addition, video input 216 may consist of an image capturing device attached to data input/output port 214. The connections may include any suitable wireless or wireline interfaces, and further may include customized or proprietary connections for specific applications.

In the exemplary implementation, the system (e.g., as part of the system application software) includes a frame interpolator function 238 configured to generate interpolated frames from a source video stream (e.g., the source video stream 108), and combine the interpolated frames with the source video stream to create a new video stream. A user may view the new "composite" video stream using the video editing program 232 or the video playback engine 236. The video editing program 232 and/or the video playback engine 236 may be readily available software with the frame interpolator 238 incorporated therein. For example, the frame interpolator 238 may be implemented within the framework of the ADOBE PREMIER video editing software.

A source video stream (e.g., the source video stream 108) may be retrieved from the electronic storage 240 or may be initially received via the video input 216 and/or the data input port 214. The source video or image stream may be uncompressed video data or may be compressed according to any known compression format (e.g., MPEG or JPEG). In some implementations, the video stream and associated metadata may be stored in a multimedia storage container (e.g., MP4, MOV) such as described in detail in U.S. patent application Ser. No. 14/920,427, entitled "APPARATUS AND METHODS FOR EMBEDDING METADATA INTO VIDEO STREAM" filed on Oct. 22, 2015, incorporated herein by reference in its entirety, and/or in a session container (e.g., such as described in detail in U.S. patent application Ser. No. 15/001,038, entitled "METADATA CAPTURE APPARATUS AND METHODS" filed on Jan. 19, 2016, incorporated herein by reference in its entirety).

Mass storage 240 may be, for instance, a conventional read/write mass storage device such as a magnetic disk drive, floppy disk drive, compact-disk read-only-memory (CD-ROM) drive, digital video disk (DVD) read or write drive, and/or non-disk-based storages such as e.g., solid-state drive (SSD), transistor-based memory or other computer-readable memory device for storing and retrieving data. The mass storage 240 may consist of the data storage unit 116 described with reference to FIG. 2, or may be realized by one or more additional data storage devices. Additionally, the mass storage 240 may be remotely located from CPU 202 and connected thereto via a network (not shown) such as a local area network (LAN), a wide area network (WAN), or the Internet (e.g., "cloud" based).

In the exemplary embodiment, the manual input 208 may receive user input characterizing desired frame rate (e.g., 60 frames per second (fps)) and/or video length of the new video stream to be generated from a source video stream. The manual input 208 may communicate the user input to the processing device 112.

In an some embodiment, a target frame rate and/or video length of the new video stream to be generated from the source video stream may be incorporated into the source video stream as metadata. The processing device 112 reads the metadata to determine the desired frame rate and/or video length for the new video stream.

In one or more implementations, the desired frame rate and/or length may be dynamically determined or variable in nature. For example, in some implementations, the host platform dynamically evaluates motion (estimation) vector data present from the encoding/decoding process of the native codec (e.g., MPEG4/AVC, H.264, or other) to determine an applicable frame rate. Temporal portions of the video content have different amounts of relative scene motion (whether by motion of objects within the FOV, or motion of the capture device or camera relative to the scene, or both). Portions that have higher relative motion may degrade the user experience and video quality if encoded at the same frame rate and compression as portions with lower relative motion. Thus, some portions may be up-rated/down-rated to improve user experience and/or reduce memory footprint. In other words, the complexity of frame weighting and frame rate for frame interpolation may be increased or decreased accordingly for such portions. Moreover, as described in greater detail below, the types and/or configuration of the algorithms used at different spatial portions and/or temporal slices of the resulting image stream may be varied depending on, e.g., inter-image distortion, inter-frame motion and/or some hybrid combinations thereof.

In embodiments where the processing device 112 is coupled to the optical capture mechanism, the processing device may additionally query or receive capture information. For example, in video camera type embodiments, the processing device 112 may determine the lens parameters of the video camera 110. In one such case, multiple different lenses may be attached and/or discoverable e.g., via a vendor loaded ROM, via cloud based network access, or other remote/local data structure. In one or more implementations, the user may manually provide such information via a user based graphical interface (GUI). Still other processing devices may determine the lens parameters based on the content itself (e.g., by identifying characteristic optical flow signatures that are common to e.g., radial lenses)

Various embodiments of the present disclosure generate interpolated frames from the source video stream using e.g., spatial and/or temporally weighted interpolation processing. The complexity of the processing may be dynamically adjusted based on a number of considerations. For instance, where user experience is less important than rendering speed (e.g., for a quick preview), frame interpolation may be performed without weighting, or with a simplified weighting scheme. In another example, multiple frames may be used with a higher order polynomial line fitting and pixel-by-pixel weighting to provide a very accurate inter-frame interpolation for slow-motion playback. Artisans of ordinary skill in the related arts will readily appreciate that the various processes described herein may be tailored and/or adjusted for any number of useful applications, the foregoing being purely illustrative.

Method—

Figure 4:
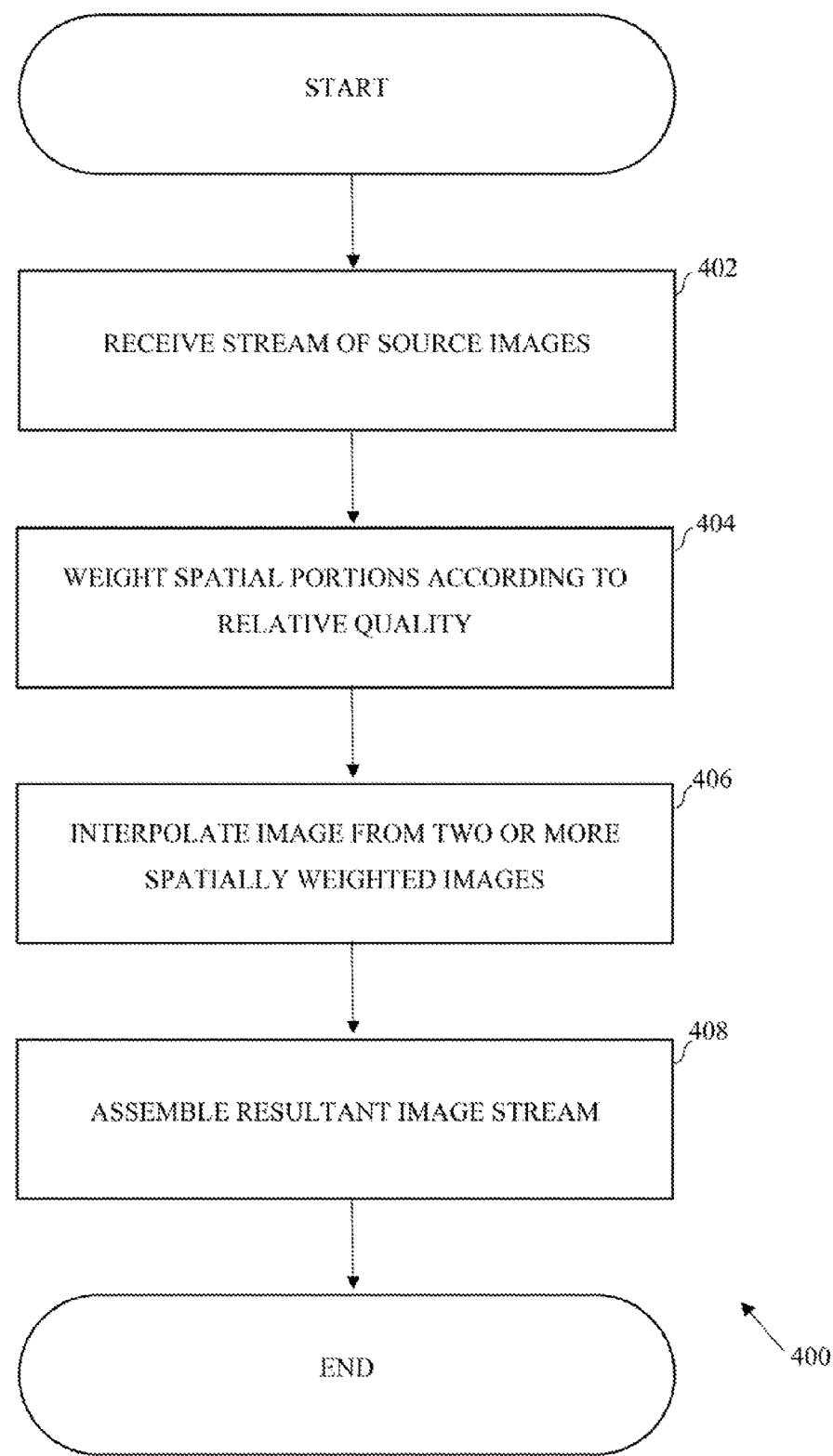
FIG. 4 is a logical flow diagram of one generalized method for improving interpolation of video frames, consistent with the principles described herein.

FIG. 4 shows a generalized method 400 for improving interpolation of video frames. As used herein, the terms "spatial weighting", "spatially weighted", and/or "spatial weight" refer to any association and/or relationship between an image space and e.g., pixel quality. Spatial relationships may be defined according to mathematical relationships (or piecewise functions thereof) and/or arbitrary relationships (e.g., via a data structure or other association scheme.) Moreover, while the present discussion is primarily disclosed within the context of two (2) dimensional space of a "flat" image, artisans of ordinary skill in the related arts given the contents of the present disclosure will readily appreciate that the various principles described herein may be readily applied to e.g., one (1) dimensional space (e.g., along the axis of a panorama) or three (3) dimensional space (e.g., for light-field cameras, holograms and/or other 3D renderings.) Moreover, different coordinate systems may be used in characterizing or describing the space, including without limitation Cartesian (x, y, z), cylindrical (r, θ, z), and/or spherical (r, θ, φ) coordinates.

At step 402 of the method 400, a stream of two (2) or more source images is received. In one exemplary embodiment, the visual content is captured via an image capture device that includes one or more cameras or other optical sensors. As used herein, the term "visual content" broadly applies to both "still" images as well as video images ("moving" images). For example, the visual content may be multiple images obtained with a six (6) lens capture device, such as that described in, for example, U.S. patent application Ser. No. 14/927,343 entitled "APPARATUS AND METHODS FOR ROLLING SHUTTER COMPENSATION FOR MULTI-CAMERA SYSTEMS" filed on Oct. 29, 2015, incorporated herein by reference in its entirety. In other examples, stereo visual content (binocular content) may include left and right images (with slight parallax).

In one or more implementations, visual content is generated either "from scratch" (e.g., computer generated graphics, computer modeling.) or rendered from other visual content (e.g., stitched together from other images). For example, a visual panorama of 360° may be obtained by stitching multiple images together (e.g., two (2) images of 180° obtained via a spherical lens). Similarly, entire artificial environments may be generated based on computer models (also referred to as "virtual reality"). Still further, various hybrid technologies meld image capture content with computer generated content along a continuum ranging from so-called "augmented reality" (addition of computer generated artifacts to image capture) to "modulated reality" (computer modification of image capture). Such computer generated pixel information may be weighted with high confidence values (e.g., because the virtual object is not subject to normal distortion effects). In some implementations, computer generated pixel information may be weighted with weights from real-world scenes/images so as to simulate distortion effects/motion blur, thereby emulating life or photographic effects consistent with real objects. Usd While the foregoing discussion describes capture/generation mechanisms which may introduce image distortion as a function of image space, artisans of ordinary skill in the related arts will readily appreciate that image distortions may also be introduced by the encoding and/or compression of captured media to video frames. In particular, encoding captured video to frames may adversely affect the pixel values e.g., due to lossy compression, rounding errors, approximations, and/or other encoding artifacts. Accordingly, some variants may also collect encoding information for determining spatially weighted pixel values.

In one or more implementations, the video encoding process directly provides output metadata that characterizes the encoding accuracy. Common examples of such metadata include e.g., deviation/variance, cumulative variance, correction data, and/or other measures of differences between an encoded frame and the original source frame. In one or more implementations, the encoding process provides output metadata that may be used to infer encoding accuracy. Common examples of such indirect metadata include e.g., measures of optical flow, measures of scene movement, differentially encoded frame size, and/or other measures of differences between an encoded frame and another encoded frame.

Still other environmental factors, capture device information, rendering device information, and/or user information may be collected for use in assigning spatial weights to source frames. Lighting conditions, focal length parameters, and environmental considerations may affect the quality of the source content; typically, a frame that is under-exposed/over-exposed should be weighted less, however certain artistic effects (image blurring) may be intentionally introduced by the user for aesthetic taste. Similarly, source content that is captured on a high end device (e.g., a high end camera) may be significantly limited to the subsequent rendering device's capabilities (e.g., a relatively small screened personal media device), and vice versa. Accordingly, applications that span a large disparity in device capabilities may adjust their quality expectations to the limitations of the limiting device's capabilities. In other words, video that is destined for a low end rendering device may only minimally benefit from the improved interpolation scheme described herein. However, other benefits of the present disclosure may be particularly advantageous where there is a large disparity in device capability. For example, a low end capture device may generate a video stream that is uprated for the rendering capabilities of a high end display. Moreover, artisans of ordinary skill in the related arts will readily appreciate that video quality is not always the primary consideration for frame interpolation. Sometimes applications may perform frame interpolation to provide smoother slow-motion replay or other time-skewed or time-elongated viewing. Still other applications are chiefly concerned with optimizing processing efficiency and/or memory footprint. Any of the foregoing applications and/or usage scenarios may be accounted for, and considered during the subsequent weighting process, described infra.

Spatial portions of each source image are weighted according to a relative quality (step 404 of the method 400). For reasons described infra, various embodiments of the present disclosure may additionally sub-categorize the weightings into their different sources of contribution. Rather than combining a spatial weight, encoder confidence weight, and an optical flow weight into a single pixel weight, the weights may be kept separate (and used differently during later steps of the process). In such case, a pixel value may be associated with a spatial weight (i.e., by virtue of its image coordinates), an encoder weight (based on a confidence or lossiness associated with the frame encoding process), as well as an optical flow weight (indicating the amount of motion that the pixel has experienced frame to frame.)

Referring now to exemplary spatial weights, the visual content may be characterized by areas of varying quality. Quality may be quantitatively measurable and/or qualitatively perceptible. In one such variant, spatial distortions are a fixed attribute of the capture/generation mechanism. For example, a spherical lens introduces distortions as a function of distance from the center of the image; these distortions correspond to diminishing visual resolution at the periphery of the captured image. Accordingly, a spherical image has a lower effective resolution at its edges. Similarly, aperture settings will affect the quality of the captured image (i.e., the aperture determines the degree to which the light entering the capture device is collimated, which directly affects the sharpness of the captured image). Certain aperture settings may result in high quality images inside a focal window, but poor capture quality for images outside the focal window. Artisans of ordinary skill in the related arts, given the contents of the present disclosure, will readily appreciate the variety of image capture settings and circumstances under which a captured image is prone to exhibit non-uniform image quality over the image space, the foregoing being purely illustrative.

Similarly, images which are rendered and/or generated (via a computer graphics program) may also exhibit certain areas that have predictably lower quality. For example, where rendering processes interpolate or extrapolate significant portions of the visual content there may be quality issues. Common examples of such rendering processes include without limitation: stretching, shrinking, stitching, blending, blurring, sharpening, and/or reconciling differences in parallax.

In another such variant, the areas of varying quality are a dynamic attribute of the capture/generation and/or encoding mechanisms. For example, dynamic changes to image capture may include changes as to lighting, motion, or other capture conditions. In some variants, the image capture device may be able to discern (e.g., via edge detection or other quality metric) which portions of the captured image are the highest quality and/or lowest quality. Similarly, videos that have significant scene motion will be differentially encoded at a much higher complexity than videos which are have limited scene motion. Consequentially, in some variants, the encoding engine may be able to discern (e.g., via optical flow or other scene movement metrics) which temporal slices of the video have the most inter-frame motion. In other "user-driven" variants, the user may be able to select (via a user interface or other selection scheme) the portions of the image or the time slices of video that are to be emphasized/de-emphasized with the highest and/or lowest quality. For example, an action video may capture some images that have been blurred by motion; upon review of the video, the user may be able to identify and indicate to the post-processing software that the foreground of the captured video is of high quality, or that more processing power should be used to compensate for the motion blur.

In one exemplary embodiment, fixed or dynamic spatial portions of the visual content may be marked as being higher or lower spatially weighted quality. In some variants, the portions of the visual content may be identified based on unchanging characteristics of the visual content (e.g., large swaths of relatively undifferentiated color due to sky or seascapes) In some variants, the amount of low quality visual content may be selected based on other considerations (e.g., to conserve memory, processing power, or other processing resources.) Still other variants may be indicated by the user (e.g. via a toggle switch), whereby the frame interpolation process is primed to aggressively reduce/increase frame rate and/or resolution based on the user's instruction (e.g., to capture anticipated action or conserve film for non-action shooting, or other lulls in activity over a temporal range.)

Spatial weighting may be performed over broad sections or areas of the frames down to a pixel-by-pixel granularity, depending on the amount of processing complexity and/or desired quality of interpolated frame(s). Certain spatial qualities may be predictably determined based on mathematical relationships. For example, for a radially distorted lens, the pixel data that is located near the center of the image exhibits the highest quality, however image quality falls off as a function of distance from the center. Common scenarios where radial spatial quality may be useful include, without limitation, e.g., spherical lens captures, image captures during forward (or backward) motion (i.e., perspective changes due to motion will dramatically affect the edge of the image, but minimally affect the center.) Other common radial relationships include without limitation e.g., Gaussian relationships, "Mexican Hat" relationships, and sinc function relationships. Still other common examples of mathematical relationships may include without limitation: the impulse function, center weighted broad window (wide band pass filter) dual wavelet function, dual Mexican Hat function, dual Gaussian function, dual impulse function, and/or any other such mathematically expressed relationship.

In some cases, multiple spatial relationships may be superimposed to achieve multimodal variances (e.g., dual peaked, triple peaked, or higher order peaks.) For example, a panoramic image which is stitched together from two (2) separate images may have two corresponding peaks in image quality, where each constituent image has its own radial peak. Notably, the center of the image which was extrapolated from the source images has a lower quality value (reflecting the uncertainty of the stitching process). For panoramic images that are stitched together from multiple overlapping but separate images, the combined overlapping band may have a higher level of quality when compared to areas that rely on only a single image. Artisans of ordinary skill in the related arts, given the contents of the present disclosure, will readily appreciate the variety of spatial relationships that may be expressed as a superposition of multiple mathematical functions (e.g., spiked, flat-topped, multimodal.)

Another common lens format and distortion is the equirectangular (so-called "Mercator") projection where the maximum image quality is at the "equator", with lower quality assigned to the "poles". Still other variants of the equirectangular projection may have varying degrees of quality along one or more of the horizontal or vertical axis (e.g., the "latitudes" and/or "longitudes"). Generally, equirectangular projections may be particularly useful when stitching two or more uniformly encoded images into a single image having a non-uniform spatially weighted quality (e.g., as certain features are stretched, shrunk, or otherwise modified.)

As previously noted, capture/generation information may be used to inform frame interpolation as a function of image space. Accordingly, in one exemplary embodiment, various portions of the image content may be assigned pixel weight value corresponding to e.g., higher/lower levels of "confidence" or "quality" for use when combining with other pixel values from other source frames. For example, in an image that has a radial distortion, the center of the image content may be weighted at the highest quality, whereas the periphery is assigned lower weights. The pixel's respective weight changes as it flows or "moves" into and out of the central area in a sequence of frames. In this manner, frame interpolation processes may appropriately account for the pixel's contribution as a function of its location within the image space. For instance, if the pixel is in the center of the image in one frame, its value for frame interpolation is high. In contrast, once the pixel has moved to the periphery of the image, the pixel's relative contribution to interpolated frames will be small.

Some applications may stitch together multiple source images, to create e.g., a "panorama." Such stitched images may have multiple sub-source images, and may be modeled with a multi-modal set of high quality areas. For example, a panorama image stitched from four (4) source images has four (4) corresponding "sub-centers" corresponding to the central focal point of each of the source sub-images. Pixel values in each of the multi-modal peak areas may be ascribed high weights. Similarly, it is appreciated that pixel values which are in the overlapping periphery of two (2) source images, may be assigned a higher weighted value than would otherwise be used for a typical peripheral area, if the two (2) source images corroborate one another.

Referring now to encoder confidence weights, the frame encoding process generates quality metrics. In one or more implementations, the encoding quality may be characterized by objective (or quantitative) quality metrics, such as mean square error (MSE), peak signal to noise ratio (PSNR), structural similarity (SSIM), and/or any other measure of the amount of loss associated with the encoding process. In some variants, the encoding quality metrics may be reference based (e.g., normalized scales); other variants may use non-reference based quality metrics.

Artisans of ordinary skill in the related arts will readily appreciate, given the contents of the present disclosure, that encoding quality metrics may be codec independent (and may be transferred across different codecs). Common examples of generic encoding quality metrics include without limitation: signal to noise ratio (SNR), modulation transfer function (MTF), and video quality measurement (VQM). Other encoding quality metrics may be codec dependent (and should be stripped out or converted when transferred to other formats.) Common examples of such encoding metrics include without limitation: building information modeling (BIM), media delivery index (MDI), bits per second (BPS), and/or sum of absolute differences (SAD).

The MSE may represent the cumulative squared error between the compressed and the original image, whereas PSNR may represent a measure of the peak error. Unlike existing schemes for generating quantitative metrics which calculate the metrics for the entire image, embodiments of the present disclosure determine the metric for each spatial region. For example, in one exemplary variant, the compressed image is segmented into a number of smaller spatial sections, and an encoding quality metric is calculated for each of the smaller spatial sections (based on the difference between the compressed subsection and the original subsection) and associated therewith.

In some cases, the spatial sections may be regular; for example, the spatial sections could be concentric rings for a radial spatial encoding relationship. In another such example, the spatial sections could be arranged according to a grid (useful for e.g., stitching applications, where image boundaries are curved and/or rectilinear) In other cases, the spatial sections may be irregular; for example, where the compressed image consists of a moving foreground against a uniform or semi-uniform background (such as snow or sky). The moving foreground will require high quality compression and may have corresponding high encoding quality parameters associated therewith, whereas the background may be rendered with relatively low quality compression.

In some implementations, subjective (or qualitative) quality metrics may be obtained by way of human input. For example, traditional mean opinion score (MOS) tests rely on a human test subject to rate the quality of reproduction on a scale of e.g., one (1) to five (5). Other common subjective metrics include without limitation: analysis of variance (ANOVA), summing and pooling, spatial regions of interest (ROI) and/or other subjective metrics. Thus, in one embodiment, the compressed image is segmented into a number of smaller spatial sections, and the human test subject may provide relative qualities associated with the spatial sections. In some cases, this may be performed over a battery of human subjects; in one or more implementations, a single user may provide the input. In some cases, the spatial sections are predefined according to the visual input (e.g., radial, Cartesian, or other coordinate system.). In other cases, the spatial sections may be identified by the user (e.g., by drawing with a finger on a touchscreen, or a mouse, or other interface device.). Still other cases may use a drag-and-drop type interface with predefined spatial shape representations. In some cases, the user may have rough control over quality, such as according to a fuzzy logic scheme ("high", "low"); in other cases, the user may have a higher granularity scale (e.g., scale of one (1) to ten (10), a slider bar, or similar). In one or more implementations, the spatial sectioning of an image into, for example, concentric circles and grids, such as those disclosed in commonly owned U.S. patent application Ser. No. 14/872,063 filed Sep. 30, 2015 and entitled "Unified Image Processing for Combined Images based on Spatially Co-located Zones", the contents of which being incorporated herein by reference in its entirety, may be utilized. Other schemes for receiving human subjective input are readily appreciated by those of ordinary skill in the related arts, given the contents of the present disclosure.

As used herein, "encoding quality" parameters (whether spatial, uniform, non-uniform, or some hybrid thereof.) include without limitation, any information regarding: processing complexity, memory usage, error quantification/qualification, and/or human perceived quality. More directly, encoding quality parameters are information or metadata that are configured to be used by a frame interpolation function to appropriately weight different pixel values of each source frame based on the relative quality or confidence in the pixel value.

Various encoder parameters may affect encoding quality, bitrate, and/or encoding computational efficiency. Common examples of encoder parameters include, but are not limited to: (i) quantization parameters (which specify the quantization granularity); (ii) so-called "dead zone" parameters (which specify the minimum quantization value); (iii) de-blocking filter strengths (i.e., to remove sharp edges (or "pixilation") created by codecs); (iv) motion vector search range; (v) transform mode selection; and/or (vi) encoder output bitrate. Moreover, artisans of ordinary skill in the related arts will further appreciate that apportioning the image into smaller or larger spatial areas allows for each of the spatial areas to be separately configured. This granularity may result in better resolution and/or post-processing efficiency but also possibly greater computational complexity. More directly, since each spatial area to be encoded/decoded is processed separately, higher spatial granularity directly results in higher encoding complexity (which may be offset by post-processing gains and/or other factors.)

Referring now to optical flow weights, various embodiments of the present disclosure account for the movement of pixels or a group of pixels within the image, across multiple frames. As used herein, the term "optical flow" refers to the apparent motion of objects, surfaces, and edges in a visual scene caused by the relative motion between a viewpoint (the vantage point of the capture device) and the scene. Generally, optical flow may be measured for a pixel or group of pixels as the spatial image distance traveled by, and velocity of, the pixel or group of pixels. In other words, image data associated with a first pixel location in an image (Frame t) "moves" to another pixel location in a subsequent image (Frame t+1). For instance, a video stream of a car will have a substantially consistent optical flow value representing the car's motion across the video frame, while the pixels associated with the background will have a substantially different optical flow (stationary).

Motion blur refers to the apparent streaking of rapidly moving objects in a still image or a video. Since motion blur has a strong correlation with large optical flow values, large optical flow values are inversely related to pixel quality. Other common effects attributed to excessive movement include loss of focus, chunking, pixelating, phantom artifacts, and/or other sampling artifacts (such as the "wagon wheel effect"), all of which adversely affect image quality and correspond directly to optical flow. In other words, faster moving objects are more likely to experience undesirable visual artifacts.

Artisans of ordinary skill in the related arts will readily appreciate, given the contents of the present disclosure, that optical flow metrics may be determined from encoding metrics. Many existing codecs provide either direct or indirect indicia of optical flow as a by-product of encoding and/or compression effort. For example, some video codecs use differential frame encoding to compress video streams. Differential frame encoding reduces overall video stream size by encoding only the information necessary to reconstruct a subsequent frame from a source frame (e.g., the pixel values that have changed, and optical flow).

In one or more implementations, optical flow metrics may be additionally assisted by external information. For example, an image capture device that is moving relative to a background will impart an apparent scene motion to the resulting video stream. The capture device's motion may be determined via e.g., accelerometers and global positioning system (GPS) receivers, beacons, or other positioning sensors. Such external movement information may be used to augment optical flow calculations.

The foregoing discussions of spatial weights, encoder weights, and optical flow weights are provided for illustrative purposes and are not limiting. Artisans of ordinary skill in the related arts, given the contents of the present disclosure, will readily appreciate that any technique for ascribing a weight to various pixels of an image may be used with equivalent success.

At step 406 of the method 400, an interpolated image is generated from two or more spatially weighted images. Exemplary embodiments of the present disclosure consider the relative quality of pixel values when performing frame interpolation. Generally, frame interpolation is performed by determining an interpolated pixel value from a range defined by the pixel values of the source frames. Typically, the interpolated pixel is the simple average of the pixel values (e.g., the pixel values from two (2) frames are summed and then halved). In contrast, various embodiments of the present disclosure leverage differently weighted pixel values to arrive at a more accurate interpolation. In some cases, a number of weights (e.g., a spatial weight, encoder confidence weight, and an optical flow weight) are combined into a single pixel weight.

In a weighted average embodiment, the interpolation equation may be expressed as:

$$p'_\alpha = k((1-\alpha)w_{(x,y)}p_{(t+1)} + (\alpha)w_{(x,y)}p_{(t)}).$$

Where w corresponds to one or more weighting factors associated with the spatial coordinates (x, y), p corresponds to the pixel values associated with a time t, and k may be a constant used to normalize the resulting interpolated pixel value. In some cases, w may be a combination of one or more of the aforementioned spatial weight, encoder confidence weight, and/or optical flow weight. In some variants, the amount of contribution of the component weights may be preferentially weighted to arrive at a modified spatial pixel weight. For example, in the center of a radially distorted image, the lens weighting may be given deference whereas at the periphery the optical flow weight is more dominant. In other words, lens distortion, optical flow, and/or encoding have different effects at different spatial locations of the image, consequently they may have disproportionate effects on pixel values.

While the foregoing weighted average is described with reference to a single spatially adjusted weight w, other implementations may adjust the weight based on spatial coordinates associated with the optical flow movement of the pixel. For example, w may need to be separately calculated for the coordinates $(x_{t+1}, y_{t+1})$ and $(x_t, y_t)$, where the coordinates are based on optical flow coordinates (i.e., the starting Cartesian coordinate, and the ending Cartesian coordinate of the pixel movement). Other variants may use the coordinate of either the starting coordinate, or the ending coordinate. Still other variants may use the starting coordinate if the interpolated frame time a is closer to the starting time, and vice versa. Other considerations such as pixel velocity, hysteresis, and/or acceleration may be used with equivalent success.

More complicated operations may attempt to line fit the pixel values from multiple frames. For example, consider a line fitting operation between Frame t, Frame t+1, and Frame t+2. Since the three (3) pixel values are unlikely to coincide with a straight line fit, the weights may be used to provide a best fit attempt and/or a higher order polynomial line fit. Fitting quality may be based on a deviation or variation of the data points from the fitting line. Higher order polynomial line fitting uses up to an $N^{th}$ order polynomial to fit N points; e.g., for three (3) points a $3^{rd}$ order polynomial fit may be used. In some cases, a hybrid of higher order polynomial fitting may be used in conjunction with the weighting; for example, the aforementioned three (3) frame scenario may use a $2^{nd}$ order polynomial, and seek to minimize a fitting variance (e.g., via a chi-squared measure). Still other variants will be made readily apparent to artisans of ordinary skill in the related arts, given the present disclosure.

In one exemplary embodiment, the frame interpolation complexity is dynamically adjusted to accommodate limitations in processing and/or memory resources based on, and/or commensurate with the associated encoding quality. For example, the frame interpolator may allocate a larger amount of resources for interpolating spatial sections of the image which have higher spatially weighted pixel values, and allocate fewer resources for lower weighted areas. By focusing processing resources to maximize output quality for visual content that is most important, interpolation may be performed faster, with less bandwidth and processing cycles, and reduce energy use. More directly, even though poorly interpolated sections may have lower visual quality, certain considerations may be more important. For example, a video stream may be exceptionally "jumpy", and a viewer is less concerned with visual acuity (in some cases, motion blur effects may even be desirable). In another example, a smart phone may have a smaller display that provides acceptable performance with lower visual quality; however, the smart phone may prioritize power consumption.

In another exemplary embodiment, the rendering device may allocate normal codec resources for interpolating the higher weighted areas, but expend additional resources for reconstructing the lower weighted areas (which may actually require more processing effort). Since normal codecs may be implemented within power efficient hardened logic (e.g., ASICs), the overall process may yield higher quality graphical outputs and/or resolutions. In some cases, offloading the high quality portions of the visual content to a hardened logic may also lower overall power consumption (when compared with using a general processor to decode the visual content in its entirety). Common examples of such applications may include high-end post-processing (where the user attempts to sharpen or modify previously captured data), and/or uprating of legacy content for e.g., newer display technologies.

Moreover, some frame interpolation schemes may actually apply different interpolation methods based on spatial area. For example, spatially weighted frame interpolation is substantially more complex than mere frame repetition. Thus, frame interpolation may only be used for the central spatial regions of the image, and frame repetition used for the periphery portions (under the assumption that the periphery may be less detailed). In order to avoid sharp visual artifacts at the border of the different interpolation schemes, the interpolated frame may further be "smoothed" via traditional filtering techniques (which need only be performed at the "joining" median.)

At step 408 of the method 408, the resulting image stream is assembled from the source images and the interpolated images. In one exemplary embodiment, the resulting video stream includes the interpolated pixel weight metadata to assist in any downstream post-processing. In one or more implementations, legacy support may be offered to unsophisticated clients by separating the resulting video stream from the interpolated pixel weight metadata (e.g., by truncating or stripping the parameters out of the data stream.) In some cases, the encoded portions of visual content have been stored according to legacy codec formats, and the spatially weighted encoding parameters may be separately retrieved by capable rendering processes. Where frame interpolation decisions may be adjusted based on external considerations (e.g., to maximize image quality, processing burden, and/or considerations other than image data), the metadata may also include such frame interpolation parameters and/or reports that convey other frame interpolation decision parameters (e.g., aggressive, conservative, estimated quality, and/or other such metadata).

In some embodiments, only a subset of the original source frames are retrieved. Limited retrieval may be especially useful when converting one video stream to another video stream rate, where the difference in video rates is a fractional rate. For example, consider a ¾ rate conversion, where three (3) frames of the source video (Frame t, Frame t+1, Frame t+2) are provided in the time interval corresponding to four (4) frames of output video (Frame t, Frame t+⅔, Frame t+1⅓, Frame t+2). The resulting output stream will skip the source Frame t+1.

Various other aspects and applications of the principles described herein are readily understood by artisans of ordinary skill in the related arts, the foregoing being illustrative.

Example Operation

One exemplary implementation that illustrates the various principles described herein is now discussed in greater detail. During frame interpolation operation, the lens distortion of an image capture device is used as a weighting factor in conjunction with optical flow metrics to improve the image quality during the pixel interpolation phase. The parameters are weighted and dynamically adjusted to compensate for the non-linear motion of objects across the image.

Figure 5:
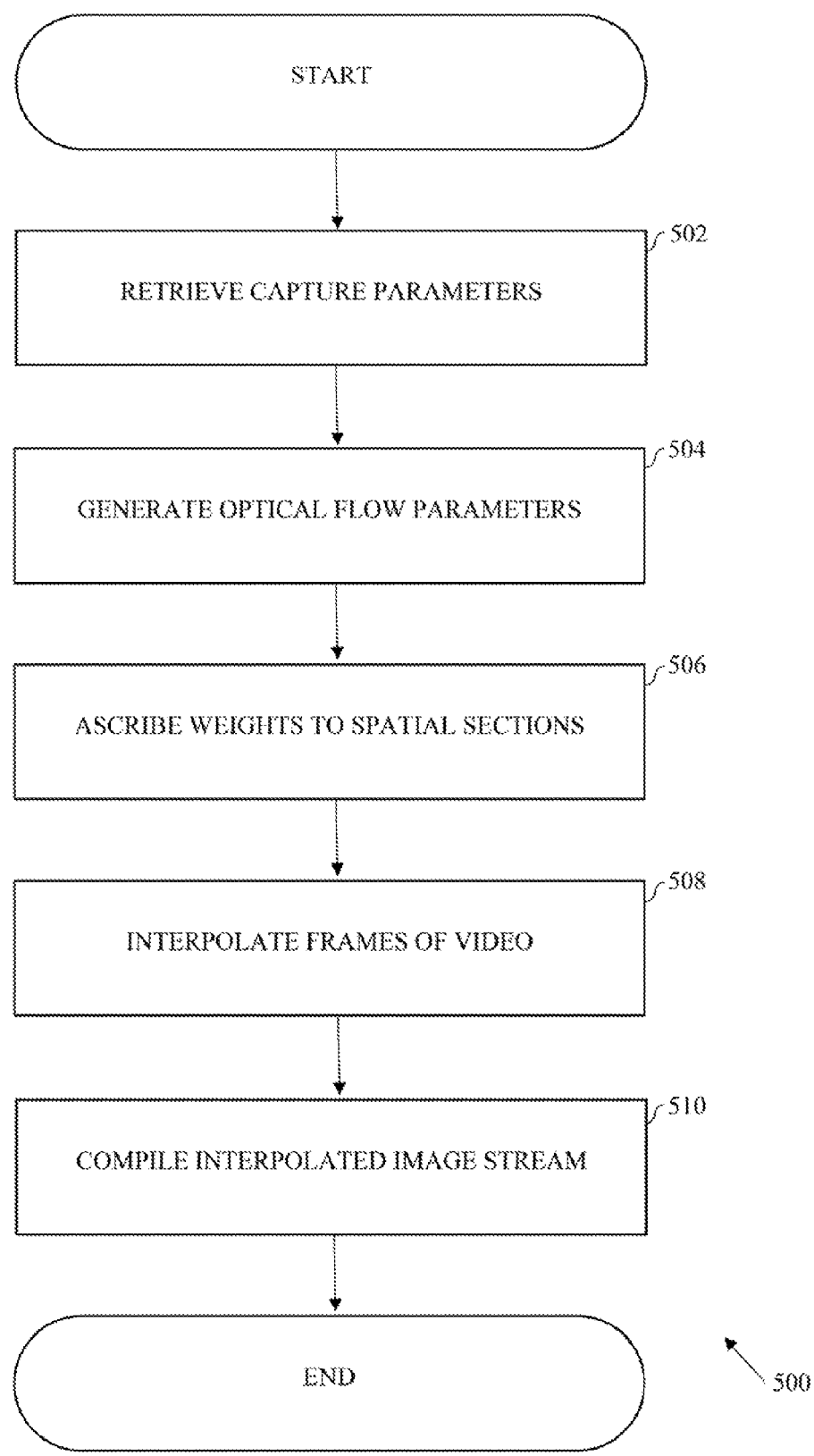
FIG. 5 is a logical flow diagram of one exemplary method for improving interpolation of video frames, consistent with the principles described herein.

FIG. 5 shows an exemplary method 500 for improving interpolation of video frames. The exemplary image capture device has specific image distortions as a function of spatial parameters (e.g., a fisheye lens). While real lenses have some limited distortion, wide field of view lenses (like fisheye lenses) have intentional distortions that are even more noticeable as the field of view (FOV) bends at the image periphery. Similarly certain types of capture device motion have predictable distortion effects; e.g., a moving object will have some combination of straight translation (motion that is parallel to the capture device's viewing perspective), curved translation (motion that is skewed relative to the viewing perspective), and shrink or stretch (motion toward or away from the vantage point). Accordingly, the image distortions are characterized according to: (i) pre-defined parameters (such as are provided on the high end camera lens), (ii) default parameters (e.g., where specific information is unavailable or unnecessary for the interpolation process), (iii) parameters derived from previous frames and/or other interpolations, and/or (iv) parameters that are dynamically inferred from scene motion and/or capture device motion.

At step 502 of the method 500, capture parameters are retrieved from the image capture device and/or captured frames of video. In the exemplary case, the image distortion that is directly attributable to the capture device's lens itself (i.e., characterized by lens parameterization data) and/or other capture device parameters may be provided directly by the user or manufacturer database (e.g., via a set-up application, network configuration, and/or other user interface). Additionally, the capture device may automatically detect certain parameters and configure itself for e.g., a modular lens assembly as part of an automated discovery process. Default parameters may also be substituted where such information is unavailable.

During live capture the capture device also continuously monitors its own movement, orientation, and/or positioning data. Such information may be gathered from sensors that are rigidly attached to the capture device body (e.g., accelerometers, and/or positioning data). This metadata may be directly used for encoding and/or frame interpolation at the time of capture, and/or stored as metadata that complements the captured video content for post-processing.

At step 504 of the method 500, optical flow parameters are generated from the captured frames of video. During the encoding and/or decoding process, the image capture device's onboard encoder generates scene motion parameters. Many existing codecs e.g., H.264, High Efficiency Video Coding (HEVC), and/or VP9 video codecs generate scene motion parameters either directly (inferred from motion flow) or indirectly (e.g., as a product of other compression/decompression operations between frames).

In some sophisticated implementations, the default lens parameterization information may be updated/overwritten by lens parameterization information that is inferred from the motion of pixels in frame and/or capture device motion. For example, where pixel movement is consistently curved according to a static radial distortion (when accounting for the known movement of the capture device), then the capture lens is inferred to have static radial distortion. Still other schemes for identifying and characterizing scene motion and/or lens distortion based on the optical flow of pixels through the spatial range of the image will be readily appreciated by artisans of ordinary skill in the related arts.

For each frame of the captured frames of video, spatial sections of the image frame are ascribed different weights depending on the capture parameters and optical flow parameters (step 506 of the method 500). As previously discussed, there are a variety of ways to model motion and lens distortions. In an ideal lens, the radial distance would be given by the fθ, where f is the focal length, and θ is the angle to the central axis of the capture device of the incoming light ray, however as demonstrated by the following equations, the radial distance may be modified by a polynomial that changes the ideal lens point projection to a distorted lens point projection. The following illustrative examples are two (2) such lens distortions functions using a 4th order polynomial:

$$r_d = f\theta(1 + K_1\theta^2 + K_2\theta^4)$$

$$r_d = f\theta\frac{(1 + K_1\theta^2 + K_2\theta^4)}{(1 + K_3\theta^2 + K_4\theta^4)}$$

In the foregoing equations, $r_d$ is the distorted point, f is the focal length, θ is the angle to the central axis of the capture device of the incoming light ray, and $K_1$-$K_4$ are the polynomial coefficients. For well-characterized lenses θ is a known value, but the focal length (f) and polynomials coefficients ($K_1$-$K_4$) must be dynamically computed based on considerations at the time of capture. Existing solutions for computing the focal length and coefficients are well known to artisans of ordinary skill in the related arts; for example, such calculations are described within e.g., "*A Flexible New Technique for Camera Calibration*" to Zhang, IEEE Transactions, Vol. 22, No. 11, pages 1330-1334, dated November 2000, incorporated by reference herein in its entirety, and/or a camera calibration toolbox available at: http://www.vision.caltech.edu/bouguetj/calib_doc/. As previously alluded to, the optical flow between two (2) frames is calculated during the encoding/decoding process e.g., to enable higher compression rates, reduce processing complexity, reduce memory footprint, and/or other optimization considerations.

Pixels which exhibit high lens distortion are weighted less than pixels that experience relatively little lens distortion to account for the relative value of the pixel information. In the context of a fisheye lens, pixels in the center of the image are highly weighted relative to the pixels at the periphery. Similarly, pixels which exhibit low optical flow values are weighted higher than pixels that have large optical flow values. More generally, pixel data that is more reliable (i.e., more predictive across frames) is weighted more heavily.

At step 508 of the method 500, one or more frames of video are interpolated from the captured frames of video based on the differently weighted image values. During frame interpolation, an interpolated frame is generated based on a proportion of the optical flow between the frames. For example, an interpolated pixel location $p_\alpha$ (where α is a fractional time selected between time t and t+1) within the interpolated Frame t+α is calculated by using a percentage of the optical flow values between the two (2) original pixel locations ($p_t$, $p_{t+1}$).

As noted, existing optical flow interpolation assumes that the motion of pixel $p_t$ to $p_{t+1}$ is a straight "linear" path. In reality, the pixel motion may be curved and/or non-linear as it moves across the image due to the distortion properties of the lens and/or movement. To account for this curvature, the lens distortion polynomial term may be used as an additional weight to accurately determine the pixel location of $p'_\alpha$ (where the "prime" notation (') indicates adjustment and/or correction to $p_\alpha$). More directly, the characteristic polynomial for lens distortion (such as exemplified in the foregoing equations) may be used to assist/improve the image quality when performing frame interpolation.

More directly, the interpolated pixel location $p_\alpha$ (before weighting) may be mathematically computed as a function of a:

$$p_\alpha = \alpha p_{t+1} + (1-\alpha)p_t$$

As described in the foregoing equation, the interpolated frame more heavily weights the pixel value that is closer in time to the interpolated time. For example, setting a value of 0.5 for a results in an even weighting between $p_t$ and $p_{t+1}$. Setting a value of 0.75 for a results in a 1:3 ratio of $p_t$ and $p_{t+1}$. In other words, the foregoing interpolated pixel location has temporally weighted the pixel values (since a is a fractional time selected between time t and t+1).

Additionally, the interpolated pixel location is also weighted based on the distortion weight (d); for example, $p'\alpha$ may be calculated according to the weighted formula:

$$p'_\alpha = d(\alpha p_{t+1} + (1-\alpha)p_t)$$

Where d is the lens distortion functions associated with the lens of the capture device. For the aforementioned exemplary radially distorted lens, d is described by the equations for $r_d$. While the foregoing equation assumes that the pixels have equivalent distortions and applies d equally to both pixel values, other implementations may calculate a separate d value for each of $p_t$ and $p_{t+1}$ based on differences in the focal length (f), and angle (θ) to the central axis of the capture device.

Figure 6:
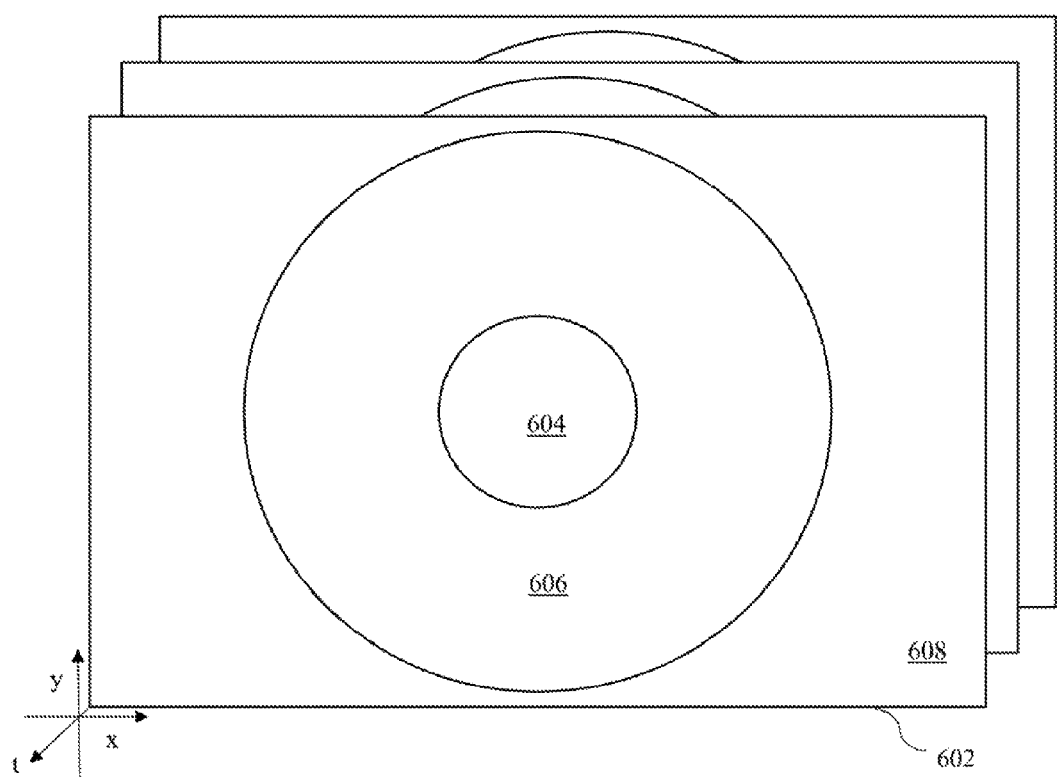
FIG. 6 is a graphical representation of one exemplary piecewise function of lens distortion over an image space.

Simpler embodiments may use a pre-determined function to describe d as a function of image space. For example, FIG. 6 illustrates one such exemplary piecewise function of d as a function of image space. As shown therein, the image 602 of FIG. 6 is split into three (3) radial zones of increasing diameter. In the first zone (the center of the image 604), the distortion attributed to the lens and movement are minimized; thus, d is a large value indicating that the pixel value should be preferentially weighted. In a second zone (the first ring 606), some distortion may be attributed to the lens/movement; thus, d is moderately weighted. In the third zone (the periphery 608), lens distortion and movement may significantly reduce the interpolative value of the pixel, thus d is minimally weighted. For example, since d is proportional to the radius in many implementations, the equation would consist of a non-linear lens distortion as a function of radius, with thresholds being set at different radial distances. Note that in these implementations, the lens distortion would differ depending upon the type of lens utilized (e.g., rectilinear, fish-eye, hyper-hemi as but some examples) and accordingly, these distortions may embodied as a function of radius depending upon the type of lens utilized.

Still other sophisticated embodiments may dynamically adjust interpolated pixel location based on both the lens distortion and the optical flow parameters. For example, $p'\alpha$ may be calculated according to different weights ascribed to each pixel value of each frame ($w_t$, $w_{t+1}$) according to the following formula:

$$p'_\alpha = (\alpha w_{t+1} p_{t+1} + (1-\alpha) w_t p_t)$$

Where w is a weighted percentage (e.g., from 0% to 100%) determined from the lens distortion and optical flow parameters. For example, where $p_t$ experiences relatively little optical flow and lens distortion when compared to $p_{t+1}$, $w_t$ will be weighted much larger than $w_{t+1}$. Conversely, where $p_t$ experiences significant optical flow and lens distortion when compared to $p_{t+1}$, $w_t$ will be weighted much smaller than $w_{t+1}$. FIG. 7 illustrates an exemplary look-up-table that provides values for w, as a function of optical flow (the absolute distance between $p_t$ and $p_{t+1}$) and the radial distance from the center of the image. Other data structures may be used with equivalent success, the foregoing being purely illustrative.

At step 510 of the method 500, the resulting video stream is compiled from the originally captured video frames and the intermingled interpolated frames. The resulting augmented video stream may be displayed, stored, transmitted, or otherwise post-processed.

Where certain elements of these implementations may be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "connection", and "link" means a causal link between any two or more entities (whether physical or logical/virtual), which enables information exchange between the entities.

As used herein, the terms "integrated circuit", "chip", and "IC" are meant to refer, without limitation, to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "microprocessor" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A computerized apparatus configured to generate interpolated frames of video data, the apparatus comprising:
a video data interface configured to receive a plurality of frames of video data;
a processing apparatus in data communication with the video data interface; and
a storage apparatus in data communication with the processing apparatus, the storage apparatus having a non-transitory computer readable medium comprising at least one computer program, the at least one computer program having instructions which are configured to, when executed by the processing apparatus, cause the computerized apparatus to:
receive two or more frames of captured video data;
retrieve one or more capture parameters associated with (i) the two or more frames of captured video data and (ii) a lens of an image capturing device;
generate one or more optical flow parameters from the two or more frames of captured video data;
for each frame of the two or more frames of captured video data, ascribe a plurality of differing weights based on one or more of the one or more capture parameters and/or the one or more optical flow parameters;
generate one or more frames of interpolated video data for the two or more frames of captured video data based at least in part on the ascribed plurality of differing weights; and
compile a resultant video stream using the one or more frames of interpolated video data and the two or more frames of captured video data.

2. The computerized apparatus of claim 1, wherein the one or more capture parameters that are associated with the lens of the image capturing device comprises lens parameterization information.

3. The computerized apparatus of claim 1, wherein the one or more capture parameters are generated from one or more sensors located on the image capturing device.

4. The computerized apparatus of claim 3, wherein the one or more sensors comprise one or more of an accelerometer sensor and/or a positioning data sensor.

5. The computerized apparatus of claim 1, wherein for each frame of the two or more frames of captured video data, the plurality of differing weights are ascribed based on the one or more capture parameters and the one or more optical flow parameters.

6. The computerized apparatus of claim 5, wherein the plurality of differing weights are ascribed as a function of a focal length of the two or more frames of video data.

7. The computerized apparatus of claim 6, wherein the plurality of differing weights are ascribed as a function of the focal length and an angle to a central axis of an image capturing device.

8. The computerized apparatus of claim 7, wherein the plurality of differing weights are ascribed as a function of the focal length, the angle to the central axis of the image capturing device and one or more polynomial coefficients.

9. A method of generating interpolated frames of captured video data, the method comprising:
receiving two or more frames of the captured video data;
retrieving one or more capture parameters associated with the two or more frames of the captured video data;
generating one or more optical flow parameters from the two or more frames of the captured video data;
for each frame of the two or more frames of the captured video data, ascribing a plurality of differing weights based on one or more of (i) the one or more capture parameters and/or (ii) the one or more optical flow parameters, and ascribing the plurality of different weights as a function of one or more of (i) a focal length of the two or more frames of the captured video data, (ii) an angle to a central axis of an image capturing device, and (iii) one or more polynomial coefficients;
generating one or more frames of interpolated video data for the two or more frames of the captured video data based at least in part on the ascribed plurality of differing weights; and
compiling a resultant video stream using the generated one or more frames of interpolated video data and the two or more frames of the captured video data.

10. The method of claim 9, associating the one or more capture parameters with a lens of an image capturing device.

11. The method of claim 10, further comprising generating the one or more capture parameters from one or more sensors located on the image capturing device.

12. The method of claim 11, further comprising generating the one or more capture parameters based at least in part on using one or more of an accelerometer sensor and a positioning data sensor.

13. The method of claim 9, wherein the ascribing of the plurality of differing weights further comprises ascribing the plurality of differing weights for each frame of the two or more frames of captured video data based on both the one or more capture parameters and the one or more optical flow parameters.

14. The method of claim 9, wherein the ascribing of the plurality of different weights comprises ascribing a first temporal weight to a first one of the two or more frames of the captured video data and ascribing a second temporal weight to a second one of the two or more frames of the captured video data.

15. A non-transitory computer-readable storage medium comprising a computer program, the computer program having a plurality of instructions configured to, when executed by a processor apparatus, cause the processor apparatus to:

receive two or more frames of video data;

generate, from one or more sensors located on an image capturing device, one or more capture parameters associated with the two or more frames of video data;

retrieve the one or more capture parameters associated with the two or more frames of video data;

generate one or more optical flow parameters from the two or more frames of video data;

for each frame of the two or more frames of video data, ascribe a plurality of differing weights based on one or more of (i) the one or more capture parameters and/or (ii) the one or more optical flow parameters;

generate one or more frames of interpolated video data for the two or more frames of video data based at least in part on the ascribed plurality of differing weights; and compile a resultant video stream using the one or more frames of interpolated video data and the two or more frames of video data.

16. The non-transitory computer-readable storage medium of claim 15, wherein the processor apparatus is configured so as to be in data communication with a video data interface, the video data interface being configured to receive the plurality of frames of video data.

17. The non-transitory computer-readable storage medium of claim 15, wherein the one or more capture parameters are associated with a lens of the image capturing device.

18. The non-transitory computer-readable storage medium of claim 17, wherein the one or more capture parameters associated with the lens of the image capturing device comprises a value associated with one or more lens distortion functions associated with the lens.

19. The non-transitory computer-readable storage medium of claim 15, wherein the ascribing of the plurality of differing weights is further based on the one or more capture parameters and the one or more optical flow parameters.

20. The non-transitory computer-readable storage medium of claim 15, wherein the ascribing of the plurality of differing weights further comprises ascribing the plurality of differing weights as a function of one or more of (i) a focal length of the two or more frames of the captured video data and (ii) an angle to a central axis of an image capturing device.

* * * * *